United States Patent
Endo et al.

(10) Patent No.: US 7,881,934 B2
(45) Date of Patent: Feb. 1, 2011

(54) METHOD AND SYSTEM FOR ADJUSTING THE VOICE PROMPT OF AN INTERACTIVE SYSTEM BASED UPON THE USER'S STATE

(75) Inventors: Norikazu Endo, Cupertino, CA (US); Benjamin K. Reaves, Mountain View, CA (US)

(73) Assignee: Toyota Infotechnology Center Co., Ltd., Tokyo (JP)

( * ) Notice: Subject to any disclaimer, the term of this patent is extended or adjusted under 35 U.S.C. 154(b) by 2429 days.

(21) Appl. No.: 10/661,152

(22) Filed: Sep. 12, 2003

(65) Prior Publication Data
US 2005/0060158 A1   Mar. 17, 2005

(51) Int. Cl.
G10L 15/28 (2006.01)
G10L 21/06 (2006.01)
G10L 11/02 (2006.01)
G10L 11/04 (2006.01)

(52) U.S. Cl. .......... 704/251; 704/275; 704/270; 704/257; 704/270.1; 704/258

(58) Field of Classification Search .......... 704/275, 704/270, 270.1, 251, 257, 258
See application file for complete search history.

(56) References Cited

U.S. PATENT DOCUMENTS

| | | | | |
|---|---|---|---|---|
| 6,144,938 | A * | 11/2000 | Surace et al. | 704/257 |
| 6,249,720 | B1 | 6/2001 | Kubota et al. | |
| 6,385,584 | B1 * | 5/2002 | McAllister et al. | 704/275 |
| 6,480,826 | B2 * | 11/2002 | Pertrushin | 704/270 |
| 6,502,081 | B1 * | 12/2002 | Wiltshire et al. | 706/12 |
| 6,658,388 | B1 * | 12/2003 | Kleindienst et al. | 704/275 |
| 6,757,362 | B1 * | 6/2004 | Cooper et al. | 379/88.01 |
| 6,760,428 | B2 * | 7/2004 | Foster | 379/265.09 |
| 6,944,592 | B1 * | 9/2005 | Pickering | 704/251 |
| 2002/0010587 | A1 * | 1/2002 | Pertrushin | 704/275 |
| 2002/0029203 | A1 * | 3/2002 | Pelland et al. | 706/12 |
| 2002/0109602 | A1 | 8/2002 | Shinada et al. | |

(Continued)

FOREIGN PATENT DOCUMENTS

JP   10-55194 A   2/1998

(Continued)

OTHER PUBLICATIONS

Nicholson et al., Emotion Recognition in Speech Using Neural Networks, Neural Computing & Applications, 2000, vol. 9, No. 4, pp. 290-296.*

(Continued)

Primary Examiner—James S Wozniak
Assistant Examiner—Abdelali Serrou
(74) Attorney, Agent, or Firm—Patent Law Works LLP

(57) ABSTRACT

The voice prompt of an interactive system is adjusted based upon a state of a user. An utterance of the user is received, and the state of the user is determined based upon signal processing of the utterance of the user. Once the state of the user is determined, the voice prompt is adjusted by adjusting at least one of a tone of voice of the voice prompt, a content of the voice prompt, a prosody of the voice prompt, and a gender of the voice prompt based upon the determined state of the user.

52 Claims, 4 Drawing Sheets

U.S. PATENT DOCUMENTS

| | | | |
|---|---|---|---|
| 2002/0184002 A1* | 12/2002 | Galli | 704/7 |
| 2003/0033145 A1* | 2/2003 | Petrushin | 704/236 |
| 2003/0093790 A1* | 5/2003 | Logan et al. | 725/38 |

FOREIGN PATENT DOCUMENTS

| | | |
|---|---|---|
| JP | 11-259271 A | 9/1999 |
| JP | 2001-83984 A | 3/2001 |
| JP | 2001-215993 A | 8/2001 |
| JP | 2001-272991 A | 10/2001 |
| JP | 2002-123289 A | 4/2002 |
| JP | 2002-221429 A | 8/2002 |

OTHER PUBLICATIONS

"Toyota Driving Companion" [online] Jun. 6, 2002, [retrieved prior to Aug. 6, 2003]. Retrieved from the Internet: <URL: http://shunk.standford.edu:88/Get/File-3596/EXPE_Presentation_Toyota_final_backup.ppt>. (18 pages).

"ME310 Winter 2000 Design Document Team Toyota: Driver-Friendly Interface" [online], Mar. 19, 2002, [retrieved prior to Aug. 6, 2003}. Retrieved from the Internet: <URL:http://shunk.standford.edu:88/Get/File—3175/Toyota_Winter_Book_Rev2.pdf>. (88 pages).

"Driver-Friendly Assistance System Interface" [online], Mar. 14, 2002, [retrieved prior to Aug. 6, 2003]. Retrieved from the Internet: <URL: http://shunk.standord.edu:88/Get/File-2966/ToyotaWinterDesignReview2002Rev2[1].ppt>. (21 pages).

"Driver-Friendly Assistance System Interface, Executive Abstract" [online], date unknown, [retrieved prior to Aug. 6, 2003]. Retrieved from the Internet: <URL:http://shunk.stanford.edu:88/Get/File-2781ExecutiveAbstract.pdf>. (2pages).

Shigenaga, Minoru, "Features of Emotionally Uttered Speech Revealed by Discriminant Analysis (V) Various Features of Prosodic and Phonemic Variables," Nov. 20, 1998, Technical Report of the Institute of Electronics, Information, and Communication Engineers, vol. 98, No. 424, pp. 49-56.

International Search Report for International Application No. PCT/JP2004/13692, dated Dec. 28, 2004.

Written Opinion of the International Searching Authority for International Application No. PCT/JP2004/13692, dated Dec. 28, 2004.

\* cited by examiner

US 7,881,934 B2

METHOD AND SYSTEM FOR ADJUSTING THE VOICE PROMPT OF AN INTERACTIVE SYSTEM BASED UPON THE USER'S STATE

TECHNICAL FIELD

The present invention relates generally to user interactive systems, and more specifically, to adjusting the voice prompt of a user interactive system based upon the state of the user.

BACKGROUND OF THE INVENTION

User interactive systems interact with their users via bi-directional communication with the users. User interactive systems may include voice response systems in which the bi-directional communication is carried out by voice communication, i.e., the user speaks to the interactive system and the user interactive system also responds by a voice prompt. Examples of user interactive systems include navigation systems used in an automobile where the user asks for directions to a particular location by voice or by typing in a destination address and the navigation system responds by displaying the directions to the user along with voice instructions corresponding to the directions. Other examples include on-board computers used in automobiles to control the various functionalities (audio, air conditioning, etc.) of the automobile based upon interaction with the user. For example, the user may control the air conditioning in the automobile by interacting with the on-board computer by voice. The user interactive system in an automobile is sometimes called a "virtual passenger," since they interact with the drivers as if another passenger were present in the vehicle.

Conventional user interactive systems typically use the same tone or content of the voice prompt when they interact with the users. For example, when a conventional vehicle navigation system gives directions to a destination to a user, it will use the same tone (e.g., high tone or subdued tone) and same content (e.g., "Turn right at third street.") regardless of the user's state or driver's state, such as emotional states (happy, sad, excited, and the like) or other states (alert, drowsy, in a hurry, and the like). However, studies have shown that the interactive systems cannot communicate effectively with the users if they use the same tone or content of the voice prompt in their interaction with the users regardless of the user's state. Some conventional user interactive systems may change the voice (actor, dialect, etc.) manually by the user choice, but they cannot adjust their voice prompts automatically by detecting the user's state.

Therefore, there is a need for a method and system for determining the user's state in an interactive system. There is also a need for a method and system for adjusting or pausing the voice prompt of the interactive system based upon the determined user's state, especially in a voice response system, so that more effective interaction with the user may be accomplished.

SUMMARY OF INVENTION

The present invention provides a method for adjusting a voice prompt of an interactive system based upon the state of a user. To this end, the method receives an utterance of the user, obtains utterance parameters indicating the state of the user from the utterance, determines the state of the user based upon the utterance parameters, and adjusts the voice prompt output by adjusting at least one of the tone of voice of the voice prompt, the content of the voice prompt, the speed or prosody of the voice prompt, and a gender of the voice prompt based upon the determined state of the user. The state of the user may also be further determined by monitoring of the driving conditions, in case of an interactive system on an automobile. To obtain the utterance parameters, the utterance is partitioned into segments, and each segment is assigned a classification corresponding to at least one of a plurality of states of the user.

To determine the state of the user, the method generates an utterance parameter vector based upon the utterance parameters, converts the utterance parameter vector to an indication representing the state of the user, and determines the state of the user based upon the indication. To generate the utterance parameter vector, the method determines the number of segments for each classification, and divides the number of segments for each classification by the total number of segments in the utterance. The utterance parameter vector is converted to the indication by applying a linear function to the utterance parameter vector to generate one of a scalar, a vector of fuzzy classes, and an index representing the state of the user. In case the indication is a scalar, it is determined that the user is in a first state if the scalar is greater than a predetermined threshold and that the user is in a second state if the scalar is not greater than the predetermined threshold.

The method of the present invention adjusts the tone of voice of the voice prompt to use a tone that is consistent with the determined state of the user. Alternatively, the method of the present invention may adjust the content of the voice prompt to use content that is consistent with the determined state of the user. The method of the present invention may also adjust the speed or prosody of the voice prompt to use speed or prosody that is consistent with the determined state of the user. The method of the present invention may also adjust the gender of the voice prompt to use a gender that is consistent with the determined state of the user. Also, the method of the present invention may adjust any combination of two or more the tone of the voice prompt, the content of the voice prompt, and the gender of the voice prompt.

The present invention also provides a system for adjusting the voice prompt of an interactive system based upon a state of a user. The system of the present invention comprises a signal processing module for obtaining utterance parameters from utterance received from the user, an utterance parameter vector generation module for generating an utterance parameter vector based upon the utterance parameters, a user state determination module for converting the utterance parameter vector to an indication representing the state of the user and determining the state of the user based upon the indication, and a speech waveform storage module for selecting an audio waveform of the voice prompt based upon the determined state of the user.

The signal processing module obtains the utterance parameters by partitioning the utterance into segments and assigning a classification to each segment. The classification corresponds to at least one of a plurality of states of the user. The utterance parameter generation module generates the utterance parameter vector by determining the number of segments assigned to each classification, and dividing the number of segments assigned to each classification by a total number of segments in the utterance. The user state determination module converts the utterance parameter vector to an indication by applying a linear function to the utterance parameter vector to generate one of a scalar, a vector of fuzzy classes, and an index representing the state of the user. In case the indication is a scalar, the user state determination module also determines that the user is in a first state if the scalar is greater than a predetermined threshold and that the user is in a second state if the scalar is not greater than the predetermined threshold.

The speech waveform storage module selects the audio waveform of the voice prompt to have a tone that is consistent with the determined state of the user. Alternatively, the speech waveform storage module selects the audio waveform of the voice prompt to have content that is consistent with the determined state of the user. The speech waveform storage module may also select the audio waveform of the voice prompt to be of a gender that is consistent with the determined state of the user.

In another embodiment, the system of the present invention may include a speech synthesizer module for synthesizing an audio waveform of the voice prompt based upon the determined state of the user, instead of or in addition to the speech waveform storage module that selects pre-stored audio waveforms. The speech synthesizer module generates the audio waveform of the voice prompt to have a tone that is consistent with the determined state of the user. The speech synthesizer module may also generate the audio waveform of the voice prompt based upon content that is consistent with the determined state of the user. Alternatively, the speech synthesizer module may synthesize the audio waveform of the voice prompt to be of a gender that is consistent with the determined state of the user.

The method and system of the present invention have the advantage that the voice prompt of the interactive system may be adjusted to be consistent with the user's emotional state, thereby appealing to the user's preferences. In case of an automobile on-board computer interactive system, adjusting the voice prompt to be consistent with the driver's state makes the driver feel comfortable and can also enhance better driving and promote alertness, confidence, and tolerance in the driver.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
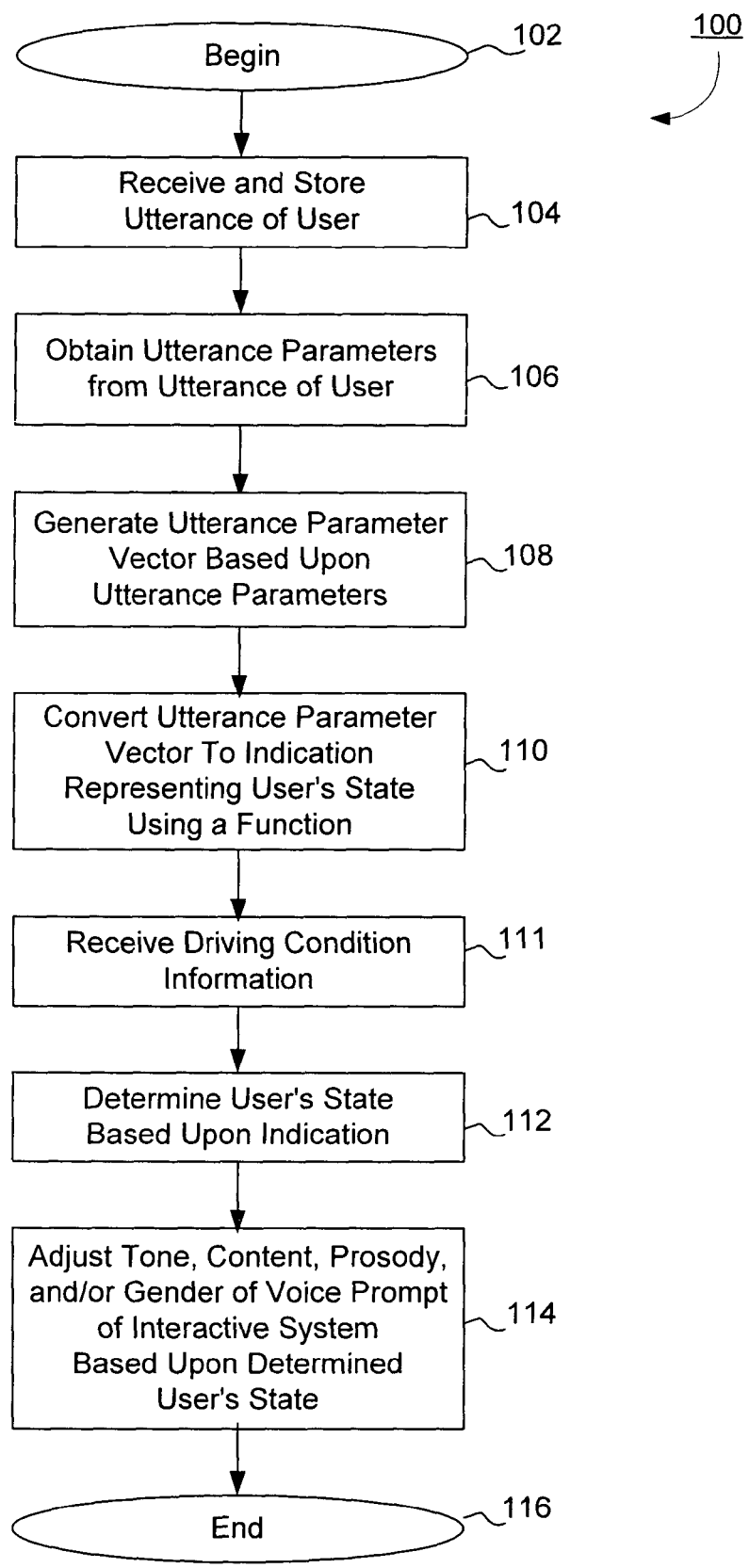
FIG. 1 is a flowchart illustrating a method for adjusting the voice prompt of an interactive system based upon a user's state, according to one embodiment of the present invention.

The embodiments of the present invention will be described below with reference to the accompanying drawings. Like reference numerals are used for like elements in the accompanying drawings.

FIG. 1 is a flowchart illustrating a method for adjusting the voice prompt of an interactive system based upon a user's state, according to one embodiment of the present invention. The method of FIG. 1 determines the state of the user of an interactive system and adjusts the voice prompt of the interactive system based upon the determined user's state. In the method of FIG. 1, it will be assumed for convenience of explanation that the interactive system is an on-board computer of an automobile and the user is a driver of the automobile, although any type of interactive system may be used consistent with the method of FIG. 1.

Referring to FIG. 1, the method begins 102 by receiving and storing 104 the utterance of the user. For example, the driver may ask the on-board computer, "How long will it take for me to drive to San Francisco, California?" Then, utterance parameters are obtained 106 from the utterance to generate 108 an utterance parameter vector based upon the obtained utterance parameters. Steps 106 and 108 will be explained in more detail with reference to FIG. 2, which is a flowchart illustrating steps 106 and 108 of the flowchart of FIG. 1 in more detail.

Figure 2:
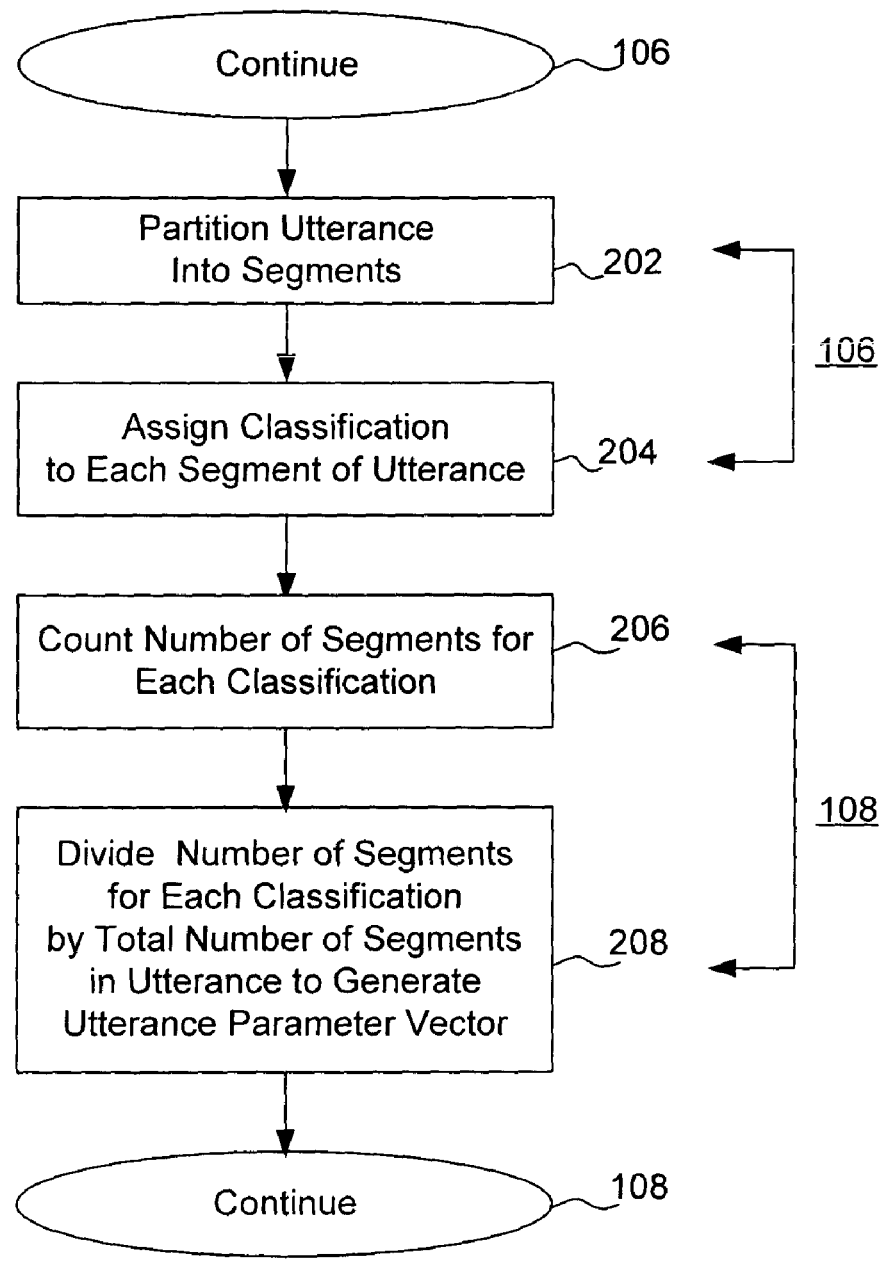
FIG. 2 is a flowchart illustrating steps 106 and 108 of the flowchart of FIG. 1 in more detail.

Referring to FIG. 2, in step 106 the utterance is partitioned 202 into segments. A segment is each phrase in the utterance with a minimum number of phonemes. The starting and ending points of a segment may be determined by detecting a pause, a silence or a sudden change in the utterance. The length of each segment may be uniform or non-uniform.

In one embodiment, each segment is assigned 204 a classification indicating one of a plurality of states of a user. For example, the classifications may include P1 (truth), P2 (stress), P3 (excitement), P4 (unsure), P5 (very stressed), P6 (voice control), P7 (tense), P8 (very tense), P9 (inaccurate), PA (implausible), PB (deceiving), PC (speech speed), PD (pause ratio), PE (clearness), PF (drowsy), PG (tired), PH (hesitation), PI (variance of the pitch during a segment), PJ (difference in pitch from one segment to the next segment), and PK (shape of the frequency spectrum in the segment). The assignment of these classifications to the segments of the utterance may be carried out by various lie detection software that is commercially available. The correspondence of particular emotional parameters to the certain types of segments of the utterance is determined empirically by inducing a certain type of emotion on a user, inducing an utterance from the user, analyzing the segments of the utterance, and statistically mapping the segments of the utterance to the type of induced emotional state of the user. Some of these parameters may vary together and thus may be grouped to reduce the number of utterance parameters. For example, PC (speech speed) and PD (pause ratio) may be grouped together.

In another embodiment, the segments may correspond to words and pauses in the utterance and each word may be assigned a classification of a general word and a particular type of emotionally sensitive word based on speech recognition. For example, in the utterance "Uhh, find a gas station," a classification such as "frustration word" may be assigned to "Uhh" and the classification "general word" may be assigned to the remaining words "find a gas station." For another example, in the utterance "Find me . . . [pause] a gas station nearby, a classification such as "at ease" or "pause" may be assigned to the [pause] in the utterance and the classification "general words" may be assigned to the remaining words "Oh find me a gas station nearby."

In step 108, the number of assigned segments for each classification is determined 206, which is further divided 208 by the total number of segments in the utterance to generate the elements of the utterance parameter vector. For example, steps 202, 204, 206, and 208 may result in the following elements of the utterance parameter vector: P1 (0.48), P2 (0.13), P3 (0), P4 (0.10), P5 (0), P6 (0), P7 (0.07), P8 (0.03), PA (0.14), PB (0.03), and PC (0.02). The utterance parameter vector has a dimension corresponding to the number of classifications and represents the user's state, e.g., happy, sad, excited, subdued, and the like. In this example, the utterance parameter vector becomes:

$V1=0.48 \cdot P1+0.13 \cdot P2+0 \cdot P3+0.10 \cdot P4+0 \cdot P5+0 \cdot P6+ 0.07 \cdot P7+0.03 \cdot P8+0.14 \cdot PA+0.03 \cdot PB+0.02 \cdot PC$ In another embodiment, the utterance parameters may also be analyzed on an emotion axis such as Stress/Relax, Happy/Sad, Excited/Calm, Tired/Aroused, and Sleepy/Awake.

In the other embodiment of classifying emotionally sensitive words in the utterance based upon speech recognition, steps 202, 204, 206, and 208 may result in the following elements of the utterance parameter vector: NGW (0.9), NFW (0.03), and NP (0.07), where NGW is the number of general words divided by N, NFW is the number of frustration words divided N, and NP is the number of pause segments divided by N, and N is the sum of the total number of words and the total number of pause segments in the utterance. The utterance parameter vector becomes:

$V2=0.9 \cdot NGW+0.03 \cdot NFW+0.07 \cdot NP.$

Although particular ways of generating the utterance parameter vector is described herein, the utterance parameter vector may be generated in other manners as long as the elements of the utterance parameter vector indicate the degree of significance of each utterance parameter.

Referring back to FIG. 1, the utterance parameter vector V1 is converted 110 to an indication representing the user's state, using a function. The function to be used to generate the indication indicative of the user's state is also empirically derived. For example, the linear function $S1=((1-P2)+P6+(1-P7)+PA+PB+PC)/6)$ is used in one embodiment of the present invention. Note that some of the detected utterance parameters are not used in the linear function S1 and that some of the detected utterance parameters may be grouped together, because not all but only certain ones of the user states may be of interest to the method of the present invention. For example, utterance parameters corresponding to the same emotion axis (Stress/Relax, Happy/Sad, Excited/Calm, Tired/Aroused, or Sleepy/Awake) may be grouped together. In the example described herein, the indication $S1=((1-0.13)+0+(1-0.07)+0.14+0.03+0.02)/6=0.3383$ (approximately). In the case of the linear function S1, it is determined that the user is happier if the scalar indication S1 is near 1 and that the user is sad if the scalar indication S1 is near 0.

In step 111, information on the driving condition may be received in case the method is used with a navigation system on an automobile. Driving condition information may include, for example, how long the user has been driving, time of the day of driving, how windy or straight the road is, location of the automobile, and the like. It takes into account that long hours of driving tend to make the driver more tired, night time driving tend to make user more sleepy, long stretches of straight road driving makes user more bored. Driving condition information may also include environmental factors such as weather conditions (rain, ice), road quality, tire quality, traffic speed along the road, heat or air conditioner operation, condition of the windows (opened or closed), type of content being played in an in-car entertainment system such as a car radio, and also driving performance measures such as lane weaving, turning, braking, and the like. Step 111 is optional but may be helpful in more accurately determining the state of the user.

Then, the user's state is determined 112 based upon the indication. In one embodiment of the invention, it is determined that the user is happy if the indication S1 is above 0.35. If the indication S1 is not above 0.35, then it is determined that the user is sad. The threshold value (0.35 herein, for happy vs. sad) used to determine the user's state is also derived empirically.

Although a particular type of linear function S1 and a particular threshold value (0.35) are described herein as an example, it should be noted that any type of function may be used as long as the function and the threshold value appropriately maps the utterance parameter vector to various user's states. For example, another linear function that may be used for the utterance parameter vector V1 is: $S2=1-P7$. In the case of the linear function S2, the user is happier if the indication S2 is near 1 and the user is sad if the indication S2 is near 0. In the case of the linear function S2, the method will determine that the user is in a happy state if the indication S2 is larger than 0.90 and the method will determine that the user is in a sad state if the indication S2 is not larger than 0.90. As another example, another linear function that may be used for the utterance parameter vector V2 is: $S3=1-NP$. In the case of the linear function S3, the user is not at ease if the indication S3 is near 1 and the user is at ease if the indication S3 is near 0. In the case of the linear function S3, the method will determine that the user is in an alert state if the indication S3 is larger than 0.95 and the method will determine that the user is in a sleepy state if the indication S3 is not larger than 0.95. The gender of the speaker of the utterance may also be determined by the analyzing the fundamental frequency of the utterance, because the fundamental frequency of a female voice is generally twice higher than that of a male voice.

The driving condition information received in step 111 may also be considered in determining the user's state. For example, certain driving condition information may be used to weight the utterance parameter vectors higher or lower. The manner in which the driving condition information should be used to weight the utterance parameter vectors is determined empirically.

Although the indication has been described as a scalar on a linear scale herein, the indication may also be in the form of a vector of fuzzy classes generated derived from fuzzy processing of the utterance parameter vector. For example, the indication may be of a vector that shows: [probability of being at ease (0.8), probability of frustration (0.1), . . . ]. The indication may also be in the form of an index derived from fuzzy processing of the utterance parameter vector. For example, the indication may be an index of an integer of 0 through 5, where 0 represents a calm male voice, 1 represents a calm female voice, 2 represents an aroused male voice, 3 represents an aroused female voice, 4 represents a neutral male voice, and 5 represents a neutral female voice.

Thereafter, the voice prompt of the interactive system is adjusted 114 based upon the determined user's state. Studies show that happy users prefer happy or aroused tone of voice or ways of speaking (content) and that sad users prefer sad or subdued tone of voice and ways of speaking (content) for the voice prompt. Studies also show that tones and content consistent with the user's state promote better driving, when the interactive system is in an automobile. Studies also show that male drivers prefer male voice prompts and female drivers prefer female voice prompts in certain cultures and vice versa in other cultures. Also, a very aroused voice prompt may cause loss of attention resulting in unsafe driving.

Depending upon the culture and the driver's preference, the method of the present invention adjusts the tone of voice, content (way of speaking), speed (prosody), and/or gender of the voice prompt of the interactive system so that they are consistent with the determined user's state. The method of the present invention may adjust one of the tone of voice, content, prosody, and gender of the voice prompt or any combination of the tone, content, prosody, and gender of the voice prompt based upon the determined user's state. The method of the present invention may also pause the voice prompt based upon the determined user's state.

For example, if the user is in a happy state, the interactive system may use a rather happy tone or aroused tone and if the user is a sad state, the interactive system may use a low tone or subdued tone. Also, the interactive system may change the content of the voice prompt to "Travel time is 30 minutes" if the user is in a happy state but change the content to "Don't worry, travel time is 30 minutes" to a user in a sad state. As another example, the interactive system may adjust both the tone and content of the voice prompt, to use "Travel time is 30 minutes" in a happy voice to a happy user but use "Don't worry, travel time is 30 minutes" in a sad voice to a sad user. As still another example, the method of the present invention may use a male voice prompt to a male user and a female voice prompt to a female user. It should be noted that any type of adjustment to the voice prompt may be done based upon the user's determined state in order to achieve effective interaction between the user and the interactive system and serve the user's preferences on the voice prompt of the interactive system.

The method of the present invention has the advantage that the voice prompt of the interactive system may be adjusted to be consistent with the user's emotional state, thereby appealing to the user's preferences. In case of an automobile on-board computer interactive system, adjusting the voice prompt to be consistent with the driver's state makes the driver feel comfortable and can also enhance better driving by promoting alertness, confidence, and tolerance.

Figure 3:
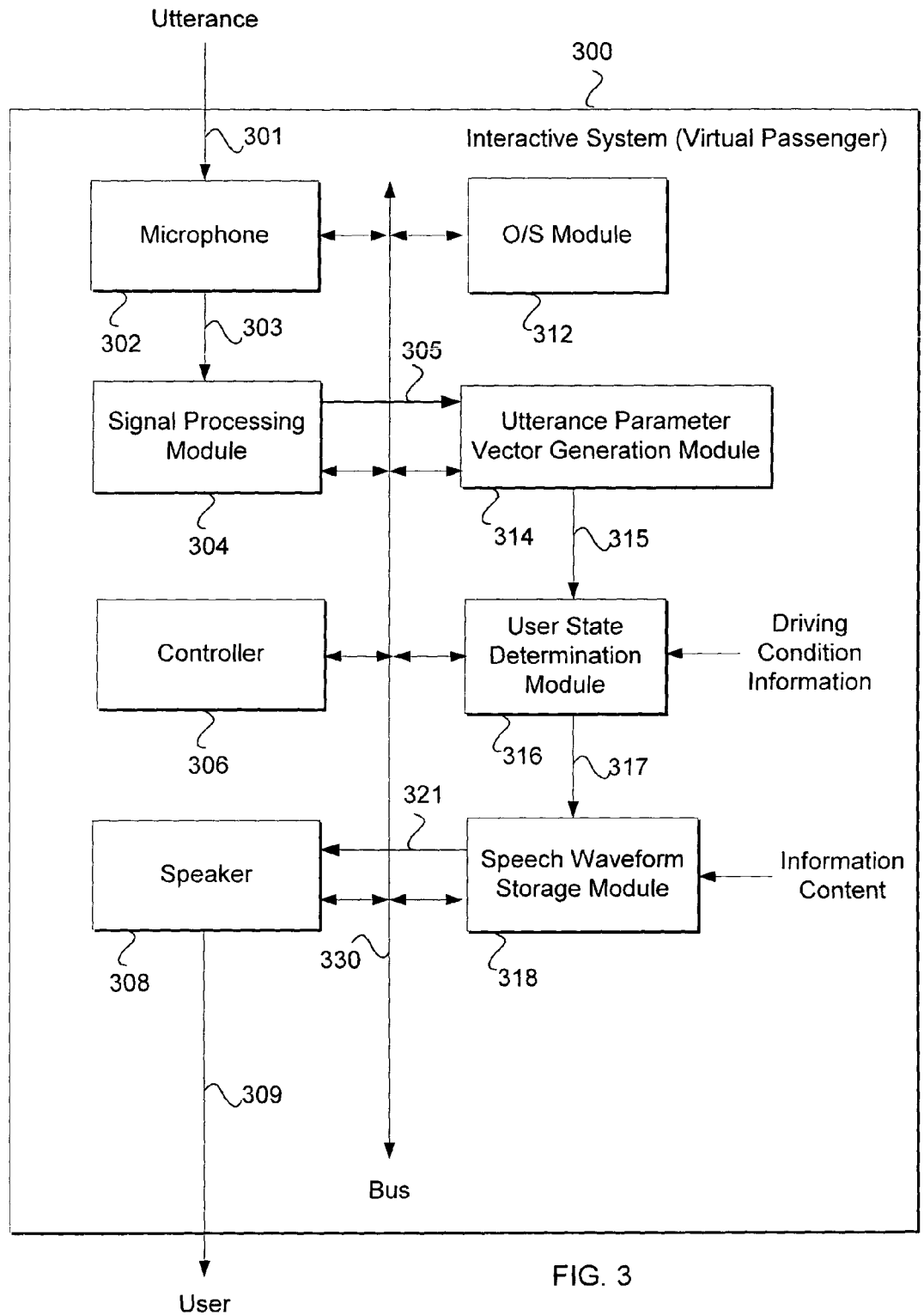
FIG. 3 is a block diagram illustrating an interactive system for adjusting its voice prompt based upon a user's state, according to one embodiment of the present invention.

FIG. 3 is a block diagram illustrating an interactive system (virtual passenger) for adjusting its voice prompt based upon a user's state, according to one embodiment of the present invention. The interactive system 300 may be, for example, an on-board computer in an automobile that is used as a "virtual passenger" for controlling the various functionalities of the automobile. Referring to FIG. 3, the interactive system 300 includes a microphone 302, a signal processing module 304, a controller 306, a speaker 308, an O/S module 312, an utterance parameter vector generation module 314, a user state determination module 316, and a speech waveform storage module 318, which are interconnected via a bus 330. The system 300 may also be off-board the automobile, for example, within a call center wirelessly connected to the automobile via a cellular telephone or other wireless communication channel. The system 300 may also partitioned such that parts (e.g., microphone, speaker, etc.) of the system 300 is on-board the automobile and other parts of the system 300 is off-board the automobile within a call center wirelessly connected to the automobile via a cellular telephone or other wireless communication channel.

The microphone 302 receives an utterance from a user in the form of an acoustic signal 301 and converts it to an electrical signal 303 that is passed on to the signal processing module 304. The signal processing module 304 partitions the utterance 303 into segments and assigns a classification to each segment, for example, as illustrated with respect to step 106 of FIG. 1 and steps 202 and 204 of FIG. 2, to obtain utterance parameters from the utterance. The signal processing module 304 may also include speech recognition capabilities incorporated therein. The signal processing module 304 may be stand-alone signal processing circuitry or a memory device storing signal processing software run by the controller 306. The signal processing module 304 provides the obtained utterance parameters 305 to the utterance parameter vector generation module 314.

The utterance parameter vector generation module 314 generates an utterance parameter vector using the obtained utterance parameters 305 by counting the number of segments for each classification and dividing the number of segments for each classification by the total number of segments in the utterance, for example, as illustrated with respect to step 108 of FIG. 1 and steps 206 and 208 of FIG. 2. The utterance parameter vector generation module 314 provides the utterance parameter vector 315 to the user state determination module 316. The utterance parameter vector generation module 314 can be dedicated circuitry for generating the utterance parameter vector or a memory device storing software for generating the utterance parameter vector and run by the controller 306.

The user state determination module 316 receives the utterance parameter vector 315 from the utterance parameter vector generation module 314. The user state determination module 316 converts the utterance parameter vector to an indication representing the user's state using a linear function, for example, as described with respect to step 110 of FIG. 1. The user state determination module 316 also determines the user's state based upon the indication, for example, as described with respect to step 112 of FIG. 1. For example, the user state determination module 316 may determine that the user is happy if the indication is above a predetermined threshold value and determine that the user is sad if the indication is not above the predetermined threshold value. The user state determination module 316 may also receive driving condition information as described in step 111 of FIG. 1 and use such driving condition information in determining the state of the user. The driving condition information may be detected and generated by a navigation system (not shown) or various sensors (not shown).

Once the user's state is determined, the user's state information 317 is passed on to the speech waveform storage module 318. The speech waveform storage module 318 is a memory device storing a plurality of sets of speech content in various tones and gender. The speech waveform storage module 318 also receives a selected information content from an external source (not shown) or the controller 306. The speech waveform storage module 318 also stores software for selecting the appropriate waveform based on the determined user state and the received information content, under the control of the controller 306. The information content or the manner in which the information content is selected or input to the speech waveform storage module is not the subject of the present invention, and it is assumed herein that the speech waveform storage module 318 receives the selected information content, i.e., the message of the voice prompt that needs to be conveyed to the user. The information content may be, for example, an indication to the user that he will have to travel 30 minutes to reach the destination (information content).

In response, the speech waveform storage module 318 selects a voice prompt audio waveform 321 that corresponds to the received information content and is consistent with the determined user state. For example, if the user is in a happy state, the speech waveform storage module 318 may select and output a voice prompt 321 "Even without hurrying, you will arrive in 30 minutes" in a happy voice. On the other hand, if the user is in a sad state, the speech waveform storage module 318 may select and output the voice prompt 321 "I think you can arrive in 30 minutes" in a sad voice. Although the information content in these voice prompts are the same (an indication to the user that he will have to travel 30 minutes to reach the destination), the content (different sentences) of the voice prompt and the tone of voice (happy or sad tone of voice) of the voice prompt and/or the speed (prosody) of the voice prompt are selected differently by the speech waveform storage module 318 based upon the determined user state information 317. The voice prompt audio waveform 321 selected by the speech waveform storage module 318 is passed on to the speaker 308. The speaker 308 outputs the selected voice prompt 309 to the user.

The controller 306 controls the operation of the various components in the interactive system 300, including the microphone 302, signal processing module 304, speaker 308, O/S module 312, utterance parameter vector generation module 314, user state determination module 316, and speech waveform storage module 318 via the bus 330. To this end, the controller 306 executes instructions or programs stored in the O/S module 312 as well as the signal processing module 304, utterance parameter vector generation module 314, user state determination module 316, and speech waveform storage module 318 to provide the various functionalities of the interactive system 300, such as determining the user state and adjusting the voice prompt of the interactive system based upon the determined user state. The O/S module 312 stores the operating system for the interactive system 300.

The system 300 may also include a display device (not shown) that is coupled to the controller 306 via the bus 330 and displays a graphical character corresponding to the voice prompt. In such case, the nature of the graphical character may also be adjusted based upon the user's determined state. For example, a happy character may be used in case of a happy user state and a sad character may be used in case of sad user state.

The interactive system of the present invention has the advantage that the voice prompt of the interactive system may be adjusted to be consistent with the user's emotional state, thereby appealing to the user's preferences. In case of an automobile on-board computer interactive system, adjusting the voice prompt to be consistent with the driver's state makes the driver feel comfortable and can also enhance better driving by promoting alertness, confidence, and tolerance.

Figure 4:
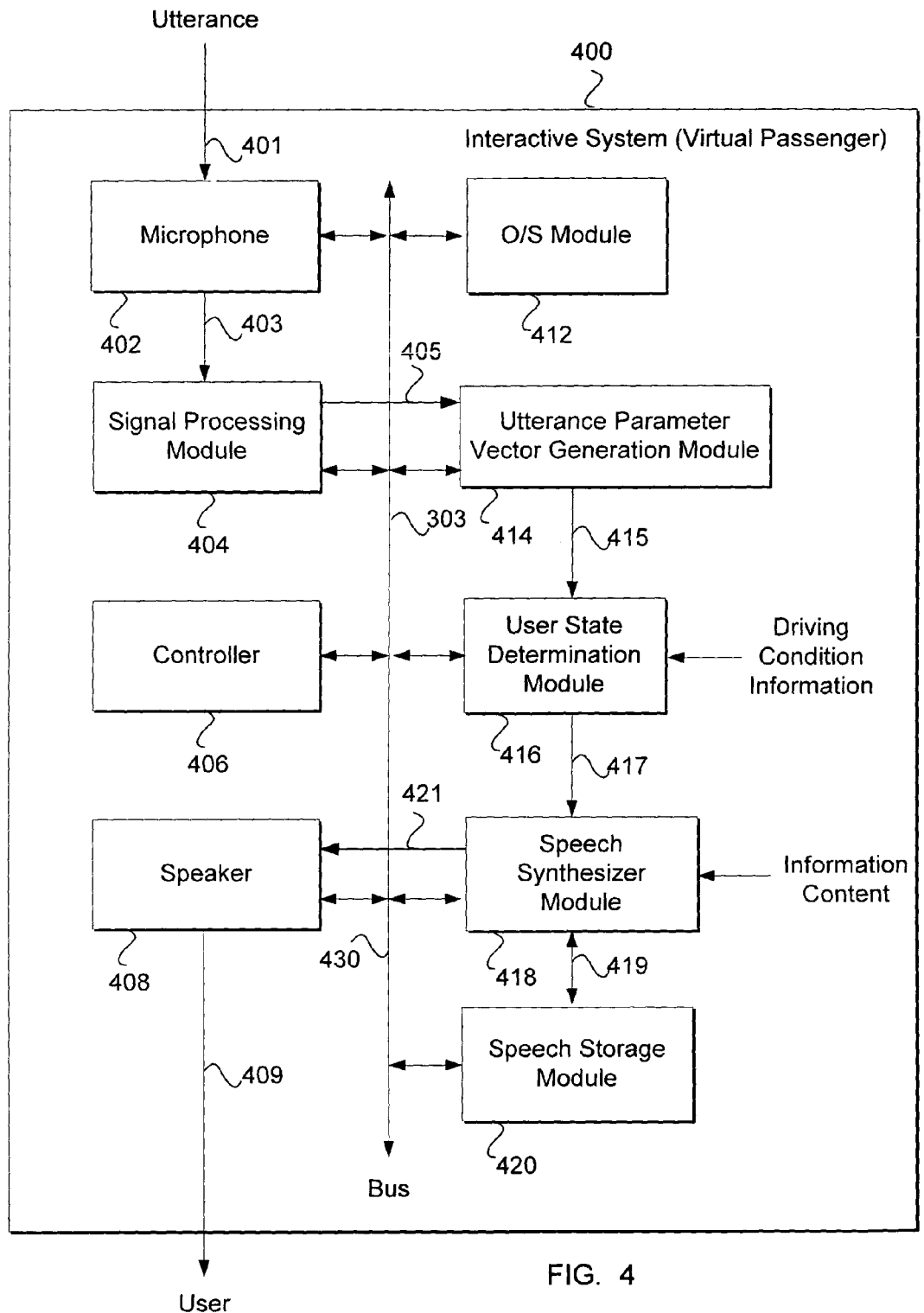
FIG. 4 is a block diagram illustrating an interactive system for adjusting its voice prompt based upon a user's state, according to another embodiment of the present invention.

FIG. 4 is a block diagram illustrating an interactive system for adjusting its voice prompt based upon a user's state, according to another embodiment of the present invention. The interactive system 400 may be, for example, an on-board computer in an automobile that is used as a "virtual passenger" for controlling the various functionalities of the automobile. The system 400 may also be off-board the automobile, for example, within a call center wirelessly connected to the automobile via a cellular telephone or other wireless communication channel. The system 400 may also partitioned such that parts (e.g., microphone, speaker, etc.) of the system 400 is on-board the automobile and other parts of the system 400 is off-board the automobile within a call center wirelessly connected to the automobile via a cellular telephone or other wireless communication channel.

Referring to FIG. 4, the interactive system 400 includes a microphone 402, a signal processing module 404, a controller 406, a speaker 408, an O/S module 412, an utterance parameter vector generation module 414, a user state determination module 416, a speech synthesizer module 418, and a speech storage module 420. The interactive system 400 of FIG. 4 is identical to the interactive system 300 of FIG. 3, except that the interactive system 400 includes the speech synthesizer module 418 and the speech storage module 420, rather than the speech waveform storage module 318, to generate the adjusted voice prompt.

Referring to FIG. 4, the speech synthesizer module 418 receives the determined user state information 417 from the user state determination module 416 and the selected information content from an external source (not shown) or the controller 406. The information content or the manner in which the information content is selected or input to the speech synthesizer module 418 is not the subject of the present invention and it is assumed herein that the speech synthesizer module 418 receives the selected information content, i.e., the message of the voice prompt that needs to be conveyed to the user. The selected information content may be, for example, an indication to the user that he will have to travel 30 minutes to reach the destination (information content).

Once the information content and the determined user state are received by the speech synthesizer module 418, the speech synthesizer module 418 retrieves the speech 419 corresponding to the information content from the speech storage module 420. The speech synthesizer module 418 may retrieve different speech (different sentences) 419 depending upon the determined user's state. The speech synthesizer module 418 also stores software for synthesizing the appropriate audio waveform 421 for the voice prompt based on the determined user state and the retrieved speech corresponding to the information content, under the control of the controller 406. The speech synthesizer module 418 synthesizes the audio waveform 421 corresponding to the retrieved speech in an appropriate tone of voice, by changing the tone generation model, or gender of the voice prompt that is consistent with the determined user state. The synthesized audio waveform 421 of the voice prompt is output to the user through the speaker 408.

For example, if the user is in a happy state, the speech waveform synthesizer module 418 may retrieve the speech 419 "Even without hurrying, you will arrive in 30 minutes" from the speech storage module 420. On the other hand, if the user is in a sad state, the speech synthesizer module 418 may retrieve the speech 419 "I think you can arrive in 30 minutes" from the speech storage module 420. Although the information content of the retrieved speech is the same (an indication to the user that he will have to travel 30 minutes to reach the destination), the content (different sentences) of the retrieved speech is selected differently by the speech storage module 420 based upon the determined user state information 417. Then, if the user is in a happy state, the speech synthesizer module 418 may synthesize and output an audio waveform 421 for the voice prompt 421 "Even without hurrying, you will arrive in 30 minutes" in a happy voice. On the other hand, if the user is in a sad state, the speech synthesizer module 418 may synthesize and output an audio waveform for the voice prompt 421 "I think you can arrive in 30 minutes" in a sad voice. Thus, both the content (sentences) and the tone of voice of the voice prompt are synthesized differently depending upon the determined user state, although the messages of the speech content in the voice prompts are identical or similar to each other.

Although the present invention has been described above with respect to several embodiments, various modifications can be made within the scope of the present invention. For example, utterance parameters other than those described herein may be used to determine the user state. Although the present invention generates utterance parameter vectors to determine the user state, other methods, such as a look-up tables and the like, may be used. Various functions, other than those described herein may be used to covert the utterance parameters to various types of indications for determination of the user state, to the extent that the indications appropriately map the utterance parameters to the user states. Although the present invention describes adjusting the tone, content, speed or prosody, and/or the gender of the voice prompt, other attributes (e.g., volume, age, etc.) of the voice prompt may be adjusted as well. Also, when different user interfaces (e.g., characters of video interface, smell, tactile communication), other than voice, are used in the interactive system, such user interfaces may also be adjusted based upon the determined user state. Accordingly, the disclosure of the present invention is intended to be illustrative, but not limiting, of the scope of the invention, which is set forth in the following claims.

What is claimed is:

1. A method of adjusting a voice prompt of a system based upon a state of a user of the system, the method comprising:
   receiving an utterance of the user;
   obtaining utterance parameters from the utterance, the utterance parameters indicating the state of the user;
   determining the state of the user based upon an utterance parameter vector; and
   adjusting the voice prompt by adjusting at least one of a tone of voice of the voice prompt, a content of the voice prompt, a prosody of the voice prompt, and a gender of the voice prompt based upon the determined state of the user, wherein obtaining utterance parameters comprises: partitioning the utterance into segments;
   assigning one of a plurality of classifications to each segment, each classification corresponding to at least one of a plurality of states of the user; and
   determining a total number of one of the plurality of classifications divided by a total number of segments of the utterance for each of the plurality of states of the user to create the utterance parameter vector.

2. The method of claim 1, wherein converting the utterance parameter vector to an indication comprises applying a function to the utterance parameter vector to generate one of a scalar, a vector of fuzzy classes, and an index representing the state of the user.

3. The method of claim 2, wherein the indication is the scalar and determining the state of the user based upon the indication comprises determining that the user is in a first state if the scalar is greater than a predetermined threshold and that the user is in a second state if the scalar is not greater than the predetermined threshold.

4. The method of claim 1, wherein adjusting the voice prompt comprises adjusting the tone of the voice prompt to use a tone that is consistent with the determined state of the user.

5. The method of claim 1, wherein adjusting the voice prompt comprises adjusting the content of the voice prompt to use content that is consistent with the determined state of the user.

6. The method of claim 1, wherein adjusting the voice prompt comprises adjusting the gender of the voice prompt to use a gender that is consistent with the determined state of the user.

7. The method of claim 1, wherein adjusting the voice prompt comprises adjusting the prosody of the voice prompt to use prosody that is consistent with the determined state of the user.

8. The method of claim 7, wherein adjusting the prosody of the voice prompt comprises pausing the voice prompt.

9. The method of claim 1, wherein the system is an on-board computer used in an automobile or a navigation system used in an automobile.

10. The method of claim 9, further comprising receiving information on a driving condition from the on-board computer or the navigation system and determining the state of the user based upon the information on driving condition.

11. The method of claim 1, further comprising adjusting a graphical character display corresponding to the voice prompt based upon the determined state of the user.

12. A method of adjusting a voice prompt of a system based upon a state of a user of the system, the method comprising:
   receiving an utterance of the user;
   obtaining utterance parameters from the utterance, the utterance parameters indicating the state of the user;
   generating an utterance parameter vector based upon the obtained utterance parameters;
   converting the utterance parameter vector to an indication representing the state of the user;
   determining the state of the user based upon the indication; and
   adjusting the voice prompt based upon the determined state of the user, wherein obtaining utterance parameters comprises:
   partitioning the utterance into segments; and
   assigning one of a plurality of classifications to each segment, each classification corresponding to at least one of a plurality of states of the user, and wherein generating the utterance parameter vector comprises: determining the number of segments for each classification; and dividing the number of segments for each classification by a total number of segments in the utterance.

13. The method of claim 12, wherein converting the utterance parameter vector to the indication comprises applying a function to the utterance parameter vector to generate one of a scalar, a vector of fuzzy classes, and an index representing the state of the user.

14. The method of claim 13, wherein the indication is the scalar and determining the state of the user based upon the scalar comprises determining that the user is in a first state if the scalar is greater than a predetermined threshold and that the user is in a second state if the scalar is not greater than the predetermined threshold.

15. The method of claim 12, wherein adjusting the voice prompt comprises adjusting the tone of the voice prompt to use a tone that is consistent with the determined state of the user.

16. The method of claim 12, wherein adjusting the voice prompt comprises adjusting the content of the voice prompt to use content that is consistent with the determined state of the user.

17. The method of claim 12, wherein adjusting the voice prompt comprises adjusting the gender of the voice prompt to use a gender that is consistent with the determined state of the user.

18. The method of claim 12, wherein adjusting the voice prompt comprises adjusting the prosody of the voice prompt to use prosody that is consistent with the determined state of the user.

19. The method of claim 18, wherein adjusting the prosody of the voice prompt comprises pausing the voice prompt.

20. The method of claim 12, wherein the system is an on-board computer used in an automobile or a navigation system used in an automobile.

21. The method of claim 20, further comprising receiving information on a driving condition from the on-board computer or the navigation system and determining the state of the user based upon the information on driving condition.

22. The method of claim 12, further comprising adjusting a graphical character display corresponding to the voice prompt based upon the determined state of the user.

23. A system adjusting a voice prompt based upon a state of a user of the system, the system comprising:
   a signal processing module for obtaining utterance parameters from utterance received from the user, the utterance parameters indicating the state of the user;

an utterance parameter vector generation module for generating an utterance parameter vector based upon the obtained utterance parameters;
a user state determination module for converting the utterance parameter vector to an indication representing the state of the user and determining the state of the user based upon the indication; and
a speech waveform storage module for selecting an audio waveform for the voice prompt based upon the determined state of the user, wherein the signal processing module obtains the utterance parameters by:
partitioning the utterance into segments; and
assigning one of a plurality of classifications to each segment, each classification corresponding to at least one of a plurality of states of the user, wherein the utterance parameter vector generation module generates the utterance parameter vector by:
determining the number of segments for each classification; and
dividing the number of segments for each classification by a total number of segments in the utterance.

24. The system of claim 23, wherein the user state determination module converts the utterance parameter vector to the indication by applying a function to the utterance parameter vector to generate one of a scalar, a vector of fuzzy classes, and an index representing the state of the user.

25. The system of claim 24, wherein the indication is the scalar and the user state determination module determines that the user is in a first state if the scalar is greater than a predetermined threshold and that the user is in a second state if the scalar is not greater than the predetermined threshold.

26. The system of claim 23, wherein the speech waveform storage module selects the audio waveform of the voice prompt having a tone that is consistent with the determined state of the user.

27. The system of claim 23, wherein the speech waveform storage module selects the audio waveform of the voice prompt having content that is consistent with the determined state of the user.

28. The system of claim 23, wherein the speech waveform storage module selects the audio waveform of the voice prompt of a gender that is consistent with the determined state of the user.

29. The system of claim 23, wherein the speech waveform storage module selects the audio waveform of the voice prompt having prosody that is consistent with the determined state of the user.

30. The system of claim 23, wherein the system is an on-board computer used in an automobile or a navigation system used in an automobile.

31. The system of claim 30, wherein the user state determination module receives information on a driving condition from the on-board computer or the navigation system and determines the state of the user based upon the information on driving condition.

32. The system of claim 23, further comprising a display device for displaying a graphical character corresponding to the voice prompt to the user, the displayed graphical character being adjusted based upon the determined state of the user.

33. A system adjusting a voice prompt based upon a state of a user of the system, the system comprising:
a signal processing module for obtaining utterance parameters from utterance received from the user, the utterance parameters indicating the state of the user;
an utterance parameter vector generation module for generating an utterance parameter vector based upon the obtained utterance parameters;
a user state determination module for converting the utterance parameter vector to an indication representing the state of the user and determining the state of the user based upon the indication; and
a speech synthesizer module for generating an audio waveform of the voice prompt based upon the determined state of the user, wherein the signal processing module obtains the utterance parameters by:
partitioning the utterance into segments; and
assigning one of a plurality of classifications to each segment, each classification corresponding to at least one of a plurality of states of the user, wherein the utterance parameter vector generation module generates the utterance parameter vector by:
determining the number of segments for each classification; and
dividing the number of segments for each classification by a total number of segments in the utterance.

34. The system of claim 33, wherein the user state determination module converts the utterance parameter vector to the indication by applying a function to the utterance parameter vector to generate one of a scalar, a vector of fuzzy classes, and an index representing the state of the user.

35. The system of claim 34, wherein the indication is the scalar and the user state determination module determines that the user is in a first state if the scalar is greater than a predetermined threshold and that the user is in a second state if the scalar is not greater than the predetermined threshold.

36. The system of claim 33, wherein the speech synthesizer module generates the audio waveform of the voice prompt to have a tone that is consistent with the determined state of the user.

37. The system of claim 33, wherein the speech synthesizer module generates the audio waveform of the voice prompt based upon content that is consistent with the determined state of the user.

38. The system of claim 33, wherein the speech synthesizer module generates the audio waveform of the voice prompt to be of a gender that is consistent with the determined state of the user.

39. The system of claim 33, wherein the speech synthesizer module generates the audio waveform of the voice prompt having prosody that is consistent with the determined state of the user.

40. The system of claim 33, further comprising a speech storage module storing speech and outputting speech that is consistent with the determined state of the user to the speech synthesizer module.

41. The system of claim 33, wherein the system is an on-board computer used in an automobile or a navigation system used in an automobile.

42. The system of claim 41, wherein the user state determination module receives information on a driving condition from the on-board computer or the navigation system and determines the state of the user based upon the information on driving condition.

43. The system of claim 33, further comprising a display device for displaying a graphical character corresponding to the voice prompt to the user, the displayed graphical character being adjusted based upon the determined state of the user.

44. A system adjusting a voice prompt based upon a state of a user of the system, the system comprising:
means for obtaining utterance parameters from utterance received from the user, the utterance parameters indicating the state of the user;
means for determining the state of the user based upon the utterance parameters; and means for adjusting the voice prompt by adjusting at least one of a tone of voice of the voice prompt, a content of the voice prompt, a prosody of the voice prompt, and a gender of the voice prompt based upon the determined state of the user, wherein the means for obtaining utterance parameters comprises:

means for partitioning the utterance into segments; and means for assigning one of a plurality of classifications to each segment, each classification corresponding to at least one of a plurality of states of the user, wherein the means for determining the state of the user based upon the utterance comprises:

means for generating an utterance parameter vector based upon the utterance parameter by (1) determining the number of segments for each classification, and (2) dividing the number of segments for each classification by a total number of segments in the utterance.

45. The system of claim 44, wherein the means for determining the state of the user based upon the utterance comprises:

means for generating an utterance parameter vector based upon the utterance parameters;

means for converting the utterance parameter vector to an indication representing the state of the user; and means for determining the state of the user based upon the indication.

46. The system of claim 45, wherein the means for converting the utterance parameter vector to the indication applies a function to the utterance parameter vector to generate one of a scalar, a vector of fuzzy classes, and an index representing the state of the user.

47. The system of claim 46, wherein the indication is the scalar and the means for determining the state of the user based upon the indication determines that the user is in a first state if the scalar is greater than a predetermined threshold and that the user is in a second state if the scalar is not greater than the predetermined threshold.

48. The system of claim 44, wherein the means for adjusting the voice prompt adjusts the tone of the voice prompt to use a tone that is consistent with the determined state of the user.

49. The system of claim 44, wherein the means for adjusting the voice prompt adjusts the content of the voice prompt to use content that is consistent with the determined state of the user.

50. The system of claim 44, wherein the means for adjusting the voice prompt adjusts the gender of the voice prompt to use a gender that is consistent with the determined state of the user.

51. The system of claim 44, wherein the means for adjusting the voice prompt adjusts the prosody of the voice prompt to use prosody that is consistent with the determined state of the user.

52. The system of claim 44, wherein the system is an on-board computer used in an automobile or a navigation system used in an automobile.

* * * * *